United States Patent [19]
Stockdale

[11] 3,961,929
[45] June 8, 1976

[54] METHOD FOR EMBOSSING A PATTERN IN GLASS

[75] Inventor: George Fairbank Stockdale, Princeton, N.J.

[73] Assignee: RCA Corporation, New York, N.Y.

[22] Filed: June 24, 1975

[21] Appl. No.: 589,854

[52] U.S. Cl. .................................... 65/35; 65/64; 65/103; 156/219; 264/293
[51] Int. Cl.² ................ C03B 29/00; C03B 23/00
[58] Field of Search ........... 264/293; 156/219, 220; 65/35, 64, 102, 103, 174, 177, 275, 317

[56] References Cited
UNITED STATES PATENTS

| | | | |
|---|---|---|---|
| 894,040 | 7/1908 | Nicholls | 65/317 X |
| 1,482,760 | 2/1924 | Milliken | 65/35 |
| 3,075,862 | 1/1963 | Hoyer | 156/219 X |
| 3,883,632 | 5/1975 | Petrochko et al. | 264/293 X |

FOREIGN PATENTS OR APPLICATIONS

| | | | |
|---|---|---|---|
| 499,520 | 2/1920 | France | 264/293 |

*Primary Examiner*—Robert L. Lindsay, Jr.
*Attorney, Agent, or Firm*—Glenn H. Bruestle; George E. Haas

[57] ABSTRACT

A piece of glass may be embossed by initially heating the glass to at least its annealing temperature. A die is heated to a temperature higher than the temperature of the glass. The die is then vibrated against the glass so that it continuously makes and breaks contact with the glass so as to prevent the glass from sticking to the hot tool.

9 Claims, 2 Drawing Figures

METHOD FOR EMBOSSING A PATTERN IN GLASS

BACKGROUND OF THE INVENTION

This invention relates to methods for embossing a pattern in a piece of glass.

Hot glass is a relatively sticky material that tends to adhere to hot embossing tools. In the manufacture of glass articles, this sticking tendency is controlled by working the hot glass with chilled tools. Fine detail however, cannot be embossed in glass with chilled tools because a skin forms on the surface of the glass, which limits the fineness of the pattern than can be impressed. This skin inhibits the flow of the glass into the small detail of the embossing die.

If the die temperature is increased to permit a greater glass flow, a condition will be reached where the glass will adhere to the tool making the embossing impossible. The adherence of molten glass to mold surfaces has been reduced by vibrating the mold while the glass was in contact with the mold as shown in U.S. Pat. No. 1,482,760 issued on Aug. 9, 1922 to J. A. Milliken. This vibration was heretofore used to eliminate the necessity for cooling the mold between separate molding operations. Carbon and graphite die materials have nonstick properties that permit their utilization in glass forming. However, these materials cannot be employed to emboss fine patterns because the details in the patterns are destroyed by the oxidation of the materials at high temperature.

SUMMARY OF THE INVENTION

Glass may be embossed with a pattern by heating the glass to its annealing temperature. A die which has been heated to a temperature higher than the glass is then pressed against the glass. The die is vibrated against the surface of the glass so that it continually makes and breaks contact with the glass. The vibration is essential to keep the glass from sticking to the hot die.

DETAILED DESCRIPTION OF THE INVENTION

Figure 1:
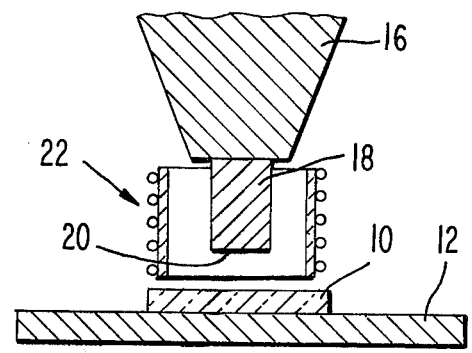
FIG. 1 is a step in the present method and an apparatus for carrying out that step.

With reference to the drawing, a piece of glass 10, such as soda-lime glass, is placed on a flat panel preheater 12. The piece of glass 10 is heated to its annealing temperature, about 500° C in the case of soda-lime glass. Due to the high temperatures involved, the heating preferably will be carried out in an enclosure (not shown). An embossing tool 16 having a die 18 is positioned above the exposed surface of the glass 10. The die 18 has an embossing surface 20 containing a negative of the pattern to be embossed in the glass 10. The die 18 is heated to a higher temperature than the glass 10 by a heating means 22. In the case of soda-lime glass the die 18 may be heated to between 700° and 800° C. The heating means 22 may comprise a small cylindrical electric furnace or a radio frequency heating coil.

Once the desired temperatures have been reached, the die 18 is brought into contact with the glass and is vibrated against the surface of the glass 10 so as to continually make and break contact with the glass. The hot die softens the glass surface and permits the pattern to be impressed into the glass. As the pattern is generated, the tool is lowered into the glass. Patterns as fine as one mil (25.4 microns) have been embossed in soda-lime glass by vibrating the die ultrasonically at about 20 KHz. The heating of the die 18 is generally continued until the embossing is complete, alternately the heating may be terminated prior to the vibration of the die against the glass. A continuous pattern may be embossed in the glass 10 by moving the glass laterally during the vibration of the die against the glass.

By preheating the glass in the present method to at least the annealing temperature of the glass, the possibility of the glass cracking upon contact with the hotter die has been eliminated. The vibration of the die prevents the glass from sticking to the hot die. This method permits the use of a die that has been heated to a temperature at which the glass will flow into relatively fine patterns in the die.

Figure 2:
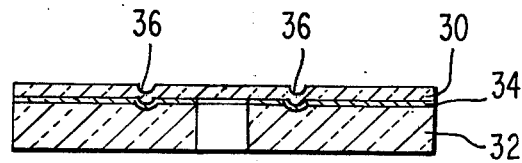
FIG. 2 is an electrically conductive seal formed by the present method.

The present method may also be employed to fuse together two pieces of glass. A gas tight seal may be formed by embossing a pattern into and through a relatively thin piece of glass, fusing the thin piece of glass to a contiguous second piece of glass. As shown in FIG. 2, gas tight electrically conductive seals have been made by using the present invention. A first piece of glass 30 is sealed to a second piece of glass 32 having a conductive oxide coating 34 such as tin oxide, at the interface with the first piece of glass by embossing a pattern 36 into and through the first piece of glass. The resistivity of the oxide coating increased slightly due to the heat treatment and the coating crazed from the radiant energy absorbed from the red hot tool during the embossing. These effects can be minimized by cooling the interior of the die. This may be accomplished by using a hollow die and circulating water through the hollow portion of the die.

I claim:

1. A method for embossing glass comprising the steps of:
   heating the glass to at least the annealing temperature of the glass;
   heating a die containing a negative of the pattern to be embossed to a higher temperature than the glass; and
   vibrating the die against the surface of glass so as to continually make and break contact between the die and the glass.

2. The method as in claim 1 wherein the die is vibrated at ultrasonic frequencies.

3. The method as in claim 1 wherein the die is heated only before it is vibrated against the glass.

4. The method as in claim 1 wherein the die is heated before and during the vibration of the die against the glass.

5. The method as in claim 1 including moving the glass laterally while the die is being vibrated against the glass.

6. The method as in claim 1 wherein, when soda-lime glass is embossed, the glass is heated to about 500° C and the die is heated to between 700° C and 800° C.

7. The method as in claim 1 wherein the die is vibrated against the glass until the pattern is embossed into and through the glass into another contiguous piece of glass so as to fuse the two pieces of glass together.

8. The method as in claim 7 wherein one piece of glass has a conductive oxide coating at the interface with the other piece of glass.

9. The method as in claim 8 wherein the interior of the die is cooled during the embossing.

* * * * *